United States Patent
Friske et al.

(10) Patent No.: US 9,910,869 B2
(45) Date of Patent: *Mar. 6, 2018

(54) DROPPING COLUMNS FROM A TABLE WITH MINIMIZED UNAVAILABILITY

(71) Applicant: International Business Machines Corporation, Armonk, NY (US)

(72) Inventors: Craig A. Friske, Morgan Hill, CA (US); Charles H. Lin, San Jose, CA (US); Regina J. Liu, San Jose, CA (US); Jerry Mukai, San Jose, CA (US); Kalpana Shyam, Los Altos, CA (US); Cherri Vidmar, Gilroy, CA (US); Julie A. Watts, Morgan Hill, CA (US); Jay A. Yothers, Gilroy, CA (US); Binghui Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 693 days.

This patent is subject to a terminal disclaimer.

(21) Appl. No.: 14/556,088

(22) Filed: Nov. 28, 2014

(65) Prior Publication Data

US 2015/0199325 A1 Jul. 16, 2015

Related U.S. Application Data

(63) Continuation of application No. 14/154,000, filed on Jan. 13, 2014, now Pat. No. 9,317,543.

(51) Int. Cl.
*G06F 17/30* (2006.01)

(52) U.S. Cl.
CPC .. *G06F 17/30292* (2013.01); *G06F 17/30315* (2013.01); *G06F 17/30339* (2013.01)

(58) Field of Classification Search
CPC ..................... G06F 17/30595; G06F 17/30377
See application file for complete search history.

(56) References Cited

U.S. PATENT DOCUMENTS

| | | | |
|---|---|---|---|
| 6,016,497 | A | 1/2000 | Suver |
| 6,965,899 | B1 | 11/2005 | Subramaniam et al. |
| 2005/0091233 | A1 | 4/2005 | Friske et al. |
| 2012/0089566 | A1 | 4/2012 | Effern et al. |

*Primary Examiner* — Hung Q Pham
(74) *Attorney, Agent, or Firm* — North Shore Patents, P.C.; Michele Liu Baillie

(57) ABSTRACT

Dropping of columns from a table with data availability, where the columns in the table are each associated with a column number, includes: executing a statement to drop a given column in the table and deferring an application of the statement until a reorganization of a current data set including the table. When the reorganization of the current data set is performed, the reorganization includes: updating column numbers for columns in each row of the table using a mapping data structure to remove the given column; loading the plurality of data rows with the updated column numbers into a shadow data set; applying to the shadow data set any changes to the table that are concurrent with the reorganization; updating a schema definition of the table with the updated column numbers; and switching the current data set to the shadow data set.

6 Claims, 4 Drawing Sheets

CREATE TABLE MYTB (A INT, B INT, C INT, D INT) IN MYDB.MYTS;   ← 301

Metadata: ← 302

| Column Name | A | B | C | D |
|---|---|---|---|---|
| Column Number | 1 | 2 | 3 | 4 |

ALTER TABLE MYTB DROP COLUMN B RESTRICT;  
ALTER TABLE MYTB DROP COLUMN C RESTRICT;  } 303

← 304  
REORG TABLESPACE MYDB.MYTS SHRLEVEL CHANGE

Correlation Array: ← 305

306 →  
307 →

| | | | | |
|---|---|---|---|---|
| Array Index (Pre-drop column number) | 1 | 2 | 3 | 4 |
| Array Value (Post-drop column number) | 1 | 0 | 0 | 2 |

Metadata: ← 302'

| Column Name | A | D |
|---|---|---|
| Column Number | 1 | 2 |

FIG. 3

Pre-drop column numbers: ← 401

| Column1 | Column2 | Column3 | Column4 | Column5 |
|---|---|---|---|---|
| 1 | 2 | 3 | 4 | 5 |

Post-drop column numbers: ← 402

| Column1 | Column2 | Column4 | Column5 |
|---|---|---|---|
| 1 | 2 | 3 | 4 |

FIG. 4

Table definitions for T1, T2, and T3: ← 501
T1(C1,C2,C3)
T2(C1,C2,C3)
T3(C1,C2,C3)

Join result for three table join, T1 join T2 join T3: ← 502

| C1(T1) | C2(T1) | C3(T1) | C1(T2) | C2(T2) | C3(T2) | C1(T3) | C2(T3) | C3(T3) |
|---|---|---|---|---|---|---|---|---|
| 1 | 2 | 3 | 4 | 5 | 6 | 7 | 8 | 9 |

Column number information for view V1 referencing 5 columns in join result: ← 503

| C1(T1) | C1(T2) | C2(T2) | C1(T3) | C3(T3) |
|---|---|---|---|---|
| 1 | 4 | 5 | 7 | 9 |

Column number information in new join result with T1 altered to add three columns: ← 504

| C1(T1) | C2(T1) | C3(T1) | C4(T1) | C5(T1) | C6(T1) | C1(T2) | C2(T2) | C3(T2) | C1(T3) | C2(T3) | C3(T3) |
|---|---|---|---|---|---|---|---|---|---|---|---|
| 1 | 2 | 3 | 4 | 5 | 6 | 7 | 8 | 9 | 10 | 11 | 12 |

Column numbers stored in V1 compared with new column numbers in join result: ← 505

|  | C1(T1) | C1(T2) ← 506 | C2(T2) | C1(T3) ← 507 | C3(T3) ← 508 |
|---|---|---|---|---|---|
| Old number | 1 | 4 | 5 | 7 | 9 |
| New number | 1 | 7 | ? | 10 | ? |

Final column numbers after applying dropping of C2 from T3: ← 509

|  | C1(T1) | C1(T2) | C2(T2) | C1(T3) | C3(T3) |
|---|---|---|---|---|---|
| Old number | 1 | 4 | 5 | 7 | 9 |
| New number | 1 | 7 | 8 | 10 | 11 |

FIG. 5 understood## DROPPING COLUMNS FROM A TABLE WITH MINIMIZED UNAVAILABILITY

BACKGROUND

Users of relational databases have existing tables of data that contain obsolete columns. The dropping of a column from a table encompasses two main parts. The first part is the modification of the metadata, i.e., catalog definition, associated with the table's schema definition, and the second part is the reorganization of the table's data to remove the dropped column data. In existing approaches, the table is placed in a restrictive state for the reorganization, which means that the data is unavailable between the time the metadata is modified to reflect the dropped column and the time that the table data reorganization is completed. For tables with substantial amounts of data, the process of reorganizing may result in an unacceptable outage.

SUMMARY

According to one embodiment of the present invention, a method drops columns from a table, where the columns in the table are each associated with a column number. The method executes a statement to drop a given column in the table and defers an application of the statement to drop the given column until a reorganization of a current data set comprising the table. The method performs the reorganization of the current data set to include the application of the statement to drop the given column. In performing the reorganization, the method updates column numbers for columns in each row of the table using a mapping data structure to remove the given column, loads the plurality of data rows with the updated column numbers into a shadow data set, applies to the shadow data set any changes to the table that are concurrent with the reorganization, updates a schema definition of the table with the updated column numbers, and switches the current data set to the shadow data set.

In one aspect of the present invention, the switching of the current data set to the shadow data set further includes updating of column numbers stored in any dependent objects of remaining columns in the table and dropping any dependent objects associated with the given column.

In one aspect of the present invention, in updating the column numbers for the columns in each row of the table using the mapping data structure to remove the given column, the method creates the mapping data structure comprising a correlation array, where an index of the correlation array represent pre-drop column numbers for the columns of the table in ascending order and where element values of the correlation array represents post-drop column numbers for the columns of the table. The method sets the element value of the given column to a predetermined value associated with a dropped column, renumbers the element value of any columns subsequent to the given column to remove the given column, and updates column numbers stored in the schema definition of the table according to the renumbered element values of the correlation array.

In one aspect of the present invention, the method determines that a view references the table, where the view stores the column numbers for the columns of the table at a time the view was created. The method updates the column numbers stored in the view according to the renumbered element values of the correlation array.

In one aspect of the present invention, the method determines that a view comprises a join referencing the table, where the view stores the column numbers of a first join result at a time the view was created. The method compares column numbers of unique column references in the first join result with column number in a second join result based on current table definitions, updates column numbers for remaining columns in the second join result based on any differences in the column numbers of the unique column references between the first join and the second join result, and further updates the column numbers for the columns in the second join result according to the removal of the given column from the table.

In one aspect of the present invention, in applying to the shadow data set of the changes to the table concurrent with the reorganization, the method reads a log for the changes to the current data set concurrent with the reorganization, converts the changes to apply to the shadow data set using the mapping data structure, and applies the converted changes to the shadow data set.

System and computer program products corresponding to the above-summarized methods are also described and claimed herein.

BRIEF DESCRIPTION OF THE SEVERAL VIEWS OF THE DRAWINGS

FIG. 3 illustrates an example of a correlation array as a mapping data structure according to embodiments of the present invention.

FIG. 4 illustrates an example of updating column numbers of a base table referenced in a view according to embodiments of the present invention.

FIG. 5 illustrates an example of updating column numbers of a join result referenced in a view according to embodiments of the present invention.

DETAILED DESCRIPTION

Figure 1:
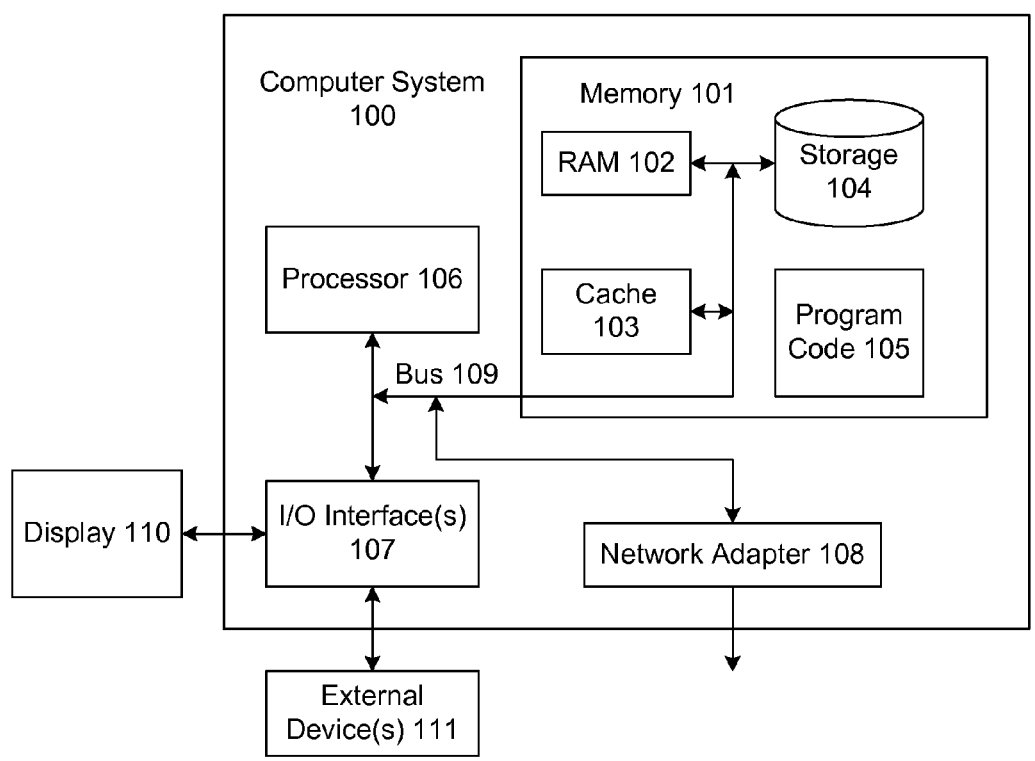
FIG. 1 illustrates a system for dropping columns from a table with data availability according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates a system for dropping columns from a table with data availability according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. In this embodiment, the present invention is implemented as part of the utilities of a relational database management system (RDBMS). A reorganization utility may be implemented as part of the program code 105 of the RDBMS or as a separate application.

Figure 2:
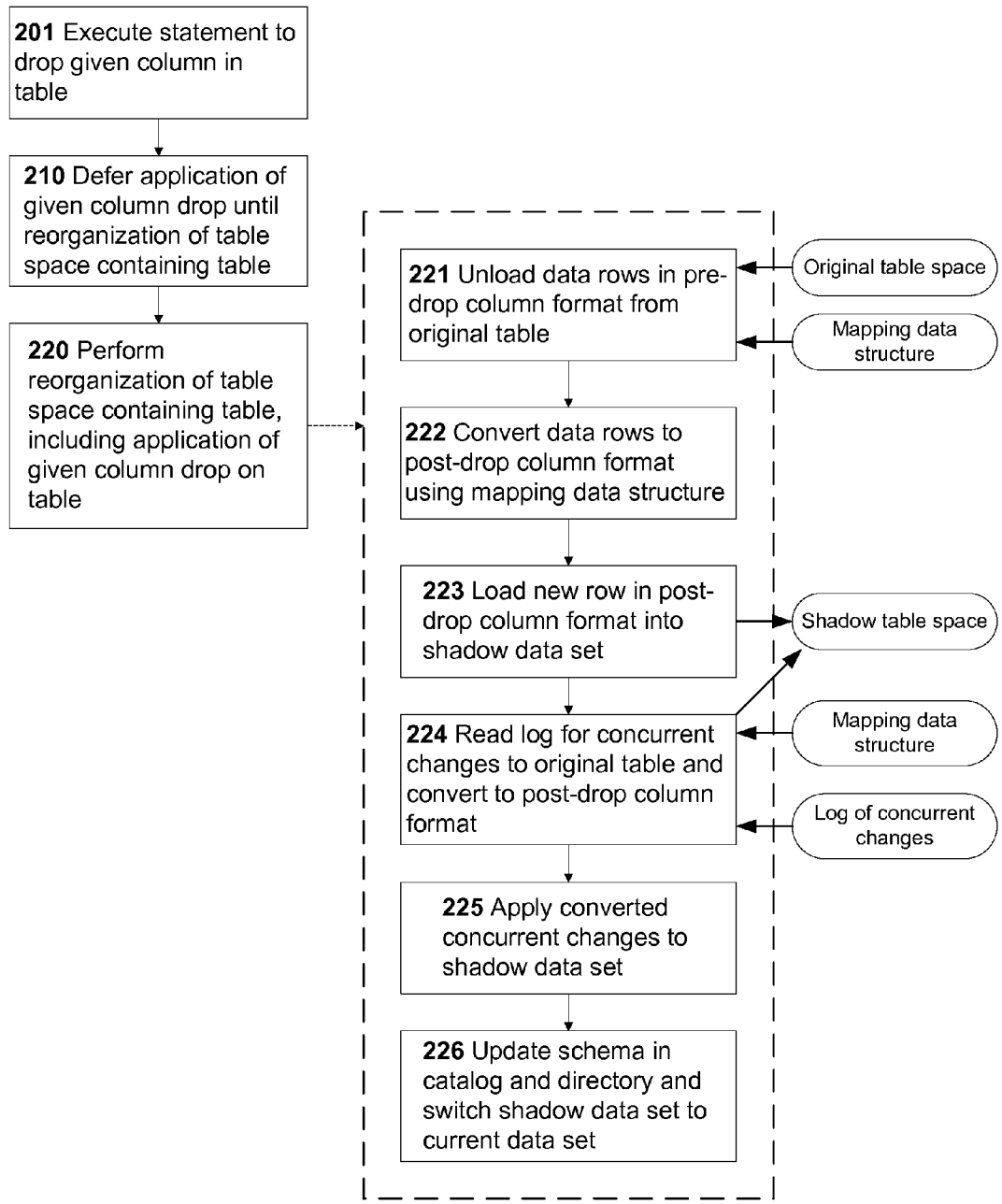
FIG. 2 is a flowchart illustrating a method for dropping columns from a table with data availability according to embodiments of the present invention.

FIG. 2 is a flowchart illustrating a method for dropping columns from a table with data availability according to embodiments of the present invention. When a statement to drop a given column in a table is executed (201), the method defers the application of the statement to drop the given column until the reorganization of the current data set containing the table (210). When the reorganization of the current data set containing the table is performed, the reorganization includes the application of the statement to drop the given column from the table (220). In this embodiment, each column in the table is assigned a column number. When a column is added to a table, it is assigned the next column number. When a column is dropped from the table, the subsequent columns are renumbered so that the columns are numbered sequentially. The column numbers of a table are stored in several different places, including the catalog and dependent objects such as views. When columns are added or dropped, the column numbers at each of these places are to be updated. Further in this embodiment, a SQL data definition language (DDL) statement is introduced to drop the given column from the table. At execution time, instead of applying the DDL statement immediately, the DDL statement is queued in a request table to be materialized during the next reorganization of the table space containing the table's data. In this manner, the DDL statement is treated as a "pending definition change". The dropping of the given column thus does not take effect immediately in the table's schema definition or in the current data set. Until the reorganization, the given column is still accessible using the table's schema definition prior to the drop. During the reorganization, the dropped column is materialized in both the table's schema definition and the data. The materialization during reorganization includes the actual removal of the dropped column from each row of the table, where each row is converted from a pre-drop column format to a post-drop column format. The schema definition changes for dropping a column includes a renumbering of subsequent columns in the table, updating dependent objects or structures that store affected column numbers, and dropping any pertinent dependent objects or structures associated with the dropped column, as described further below. In the pre-drop column format, a row includes column numbers and dependent objects or structures prior to the dropping of columns. In the post-drop column format, a row includes the renumbered subsequent columns in the table with updated dependent objects or structures resulting from the dropping of columns.

FIG. 2 further illustrates in more detail the reorganization of the table space containing the table with the dropped column, according to embodiments of the present invention. During the reorganization, the queued pending definition changes are applied, both to the table's schema definition and to the current data set. Multiple columns can be dropped from the same table as pending definition changes. Any concurrent updates with the reorganization operate on the pre-drop column format of a row, and the updates are logged. The method unloads data rows in a pre-drop column format from the current data set (221). The method updates the column number in each data row, i.e., converts each data row to the post-drop column format, using a mapping data structure, as described further below (222). The rows with the updated column numbers are then loaded into a shadow data set (223). The method reads the log for concurrent changes to the table in the current data set and converts these concurrent operations to the post-drop column format to be applied to the shadow data set (224). For example, if the log contains an update on a column whose column number was renumbered, the update is changed to reflect the updated column number. For another example, if the log contains an update on a dropped column, the update is dropped as well. The converted concurrent changes are then applied to the shadow data set (225). Next, the method performs the "switch" phase, where the shadow data set becomes the current data set, and the table's schema definition in the catalog and directory are updated with the updated column numbers (226).

In one embodiment, a correlation array is used as the mapping data structure for converting a row from the pre-drop column format to the post-drop column format. FIG. 3 illustrates an example of a correlation array as a mapping data structure according to embodiments of the present invention. As set forth in the CREATE statement 301, table MYTB is created in table space MYDB.MYTS to contain four columns. The metadata 302 for table MYTB's schema includes the column names (A, B, C, and D) and their corresponding column numbers (1, 2, 3, and 4), respectively. Assume that ALTER statements 303 to drop columns B and C are then executed (201 of FIG. 2). The ALTER statements 303 are queued as pending definition changes, and their applications are deferred until the reorganization of the table space MYDB.MYTS (210 of FIG. 2). During the execution of a REORG statement 304 to reorganize the table space MYDB.MYTS, a correlation array 305 is created for use in converting the data rows of table MYTB from the pre-drop column format to the post-drop column format (222 of FIG. 2). The array index 306 represents the pre-drop column number of each column in table MYTB in ascending order, and the values of the array elements 307 represent the post-drop column number of each column in table MYTB. When a column is dropped, the element value for the column is set to zero. In the correlation array 305, array index 1, 2, 3, and 4 correspond to columns A, B, C, and D, respectively, prior to the application of the ALTER statements 303. The ALTER statements 303 drop columns B and C, corresponding to column numbers 2 and 3 in the pre-drop column format. After being dropped, the values of array elements 2 and 3 are set to zero, and the column numbers for the subsequent column D is renumbered to 2. Thus, in the post-drop column format, the array element values are 1, 0, 0, and 2. In this manner, the pre-drop column number is mapped to the post-drop column number. After all data in table MYTB have been converted to their post-drop column format, the associated metadata 302' is also updated to remove the columns that were dropped and to reflect the new column numbers of the remaining columns.

Although the above embodiment of the present invention is described using a correlation array, other data structures may be used to map the pre-drop column format to the post-drop column format without departing from the spirit and scope of the present invention.

The dropped columns may be associated with dependent objects, such as indexes, LOB table spaces, views, and packages. These objects are logically connected with the table columns using a relative column number. Thus, they must also be updated with the appropriate column numbers during the "switch" phase. For example, when the column number of a column is renumbered, the column number reflected in its dependent object must be updated with the new column number. For another example, the dropped column may be a large object (LOB) column. Typically, LOB data is not stored in the source table, but rather in a separate LOB table space with an index. When a LOB column is dropped, the LOB table space and the index would be dropped as well. For these dependent objects, certain processes during the reorganization will be skipped, such as the cleanup process, i.e., the deletion of the underlying data sets and index would be skipped.

For another example, a view may reference a table from which a column is dropped after the view was created. The internal structure of the view stores the column numbers of the table columns at the time the view is created. When columns are added or dropped from the table after the view was created, the column numbers will change, and the column numbers stored in the view will require updating. Columns are referenced in a view in two ways: columns in a base table; and columns in join results. FIG. 4 illustrates an example of updating column numbers of a base table referenced in a view according to embodiments of the present invention. In this example, the view references Column1, Column2, Column3, Column4, and Column5 of a base table. At the time the view was created, the column numbers 1, 2, 3, 4, and 5 in the pre-drop column format 401 are stored in the view. Assume that after the view was created, Column3 is dropped from the base table. The column numbers for the subsequent columns, Column4 and Column5, are then renumbered or mapped to the post-drop column format 402 using the correlation array, as described above.

FIG. 5 illustrates an example of updating column numbers of a join result referenced in a view according to embodiments of the present invention. A join result is constructed by concatenating all columns of each base table in the join order. The example illustrates a join when base tables are altered to add columns after the view has been created, and then columns are dropped from one of the base tables. Although the column numbers of the base tables are stored in the internal structure of the view when the view was created, the number of columns in a base table is not stored. This requires additional handling in determining the renumbered columns for a join result. For example, assume that the join involves three base tables, T1, T2, and T3, with table definitions 501. Illustrated is the join result 502 for the three table join, T1 join T2 join T3. Also illustrated is a view, V1, created with the table definitions 501, which references five columns from the join result. V1 would store the column number information 503 for the referenced five columns, but the total number of columns in the join, 9, is not stored. After V1 was created, assume that T1 was altered to add three more columns. When V1 is referenced, a new join result is built based on the current table information to compare with what is stored in the view. Illustrated is the column number information in the new join result 504. Assume that C2 is then dropped from T3. To determine the column numbers after C2 in T3 is dropped, the column numbers after the three columns were added to T1 need to be considered, without the knowledge of the number of columns added to T1 since V1 was created. First, the column numbers stored in V1 and the newly generated column numbers in the join result are compared 505. The new column numbers are generated for an affected source table using the correlation array, described above. Unique column references (columns with the same names but have different column numbers) are identified. In the illustrated example, there are three unique references to C1, from each of the three base tables, T1, T2, and T3. The first reference of C1 (506) retains the same column number, while the new column numbers for the second and third references of C1 (507, 508) have increased by three. The column number for C1 from T2 increased from 4 to 7. The column number for C1 from T3 increased from 7 to 10. Since the new join result 505 shows references to C1 in each base table, the method may deduce that table T1 in the join order had three columns added since V1 was created. Using this deduction, column number of C2 in T2 is updated to 8 (old column number 5 plus 3). Similarly, the column number of C3 in T3 is updated to 12 (old column number 9 plus 3). Since C2 in T3 is dropped, C3's column number is further adjusted to 11. Illustrated are the final column numbers 509 after applying the dropping of C2 from T3.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dropping columns from a table, wherein the columns in the table are each associated with a column number, comprising:
   executing, by a computing processor, a statement to drop a given column in the table;
   deferring, by the computing processor, an application of the statement to drop the given column until a reorganization of a current data set comprising the table; and
   performing, by the computing processor, the reorganization of the current data set to comprise the application of the statement to drop the given column, comprising:
   updating column numbers for columns in each row of the table using a mapping data structure to remove the given column;
   loading the plurality of data rows with the updated column numbers into a shadow data set;
   applying to the shadow data set any changes to the table that are concurrent with the reorganization;
   updating a schema definition of the table with the updated column numbers; and
   switching the current data set to the shadow data set.

2. The method of claim 1, wherein the switching of the current data set to the shadow data set further comprises:
   updating column numbers stored in any dependent objects of remaining columns in the table; and
   dropping any dependent objects associated with the given column.

3. The method of claim 1, wherein the updating of the column numbers for the columns in each row of the table using the mapping data structure to remove the given column comprises:

creating the mapping data structure comprising a correlation array, wherein an index of the correlation array represents pre-drop column numbers for the columns of the table in ascending order, wherein element values of the correlation array represent post-drop column numbers for the columns of the table, setting the element value of the given column to a predetermined value associated with a dropped column;

renumbering the element value of any columns subsequent to the given column to remove the given column; and updating column numbers stored in the schema definition of the table according to the renumbered element values of the correlation array.

4. The method of claim 3, wherein the updating of the schema definition of the table with the updated column numbers further comprises:

determining that a view references the table, wherein the view stores the column numbers for the columns of the table at a time the view was created; and updating the column numbers stored in the view according to the renumbered element values of the correlation array.

5. The method of claim 3, wherein the updating of the schema definition of the table with the updated column numbers comprises:

determining that a view comprises a join, referencing the table, wherein the view stores the column numbers of a first join result at a time the view was created;

comparing column numbers of unique column references in the first join result with column number in a second join result based on current table definitions;

updating column numbers for remaining columns in the second join result based on any differences in the column numbers of the unique column references between the first join and the second join result; and further updating the column numbers for the columns in the second join result according to the removal of the given column from the table.

6. The method of claim 1, wherein the applying to the shadow data set of the changes to the table concurrent with the reorganization comprises:

reading a log for the changes to the current data set concurrent with the reorganization;

converting the changes to apply to the shadow data set using the mapping data structure; and applying the converted changes to the shadow data set.

* * * * *